(12) United States Patent
Bartkowiak et al.

(10) Patent No.: US 9,346,960 B2
(45) Date of Patent: May 24, 2016

(54) COATINGS FOR CELLULOSIC MATERIAL AND METHODS OF PREPARING AND APPLYING THEREOF

(71) Applicant: Zachodniopomorski Uniwersytet Technologiczny w Szczecinie, Szczecin (PL)

(72) Inventors: Artur Bartkowiak, Szczecin (PL); Jerzy Balejko, Szczecin (PL); Slawomir Lisiecki, Szczecin (PL); Maria Chojnacka, Szczecin (PL)

(73) Assignee: ZACHODNIOPOMORSKI UNIWERSYTET TECHNOLOGICZNY W SZCZECINIE, Szczecin (PL)

(*) Notice: Subject to any disclaimer, the term of this patent is extended or adjusted under 35 U.S.C. 154(b) by 255 days.

(21) Appl. No.: 13/718,753

(22) Filed: Dec. 18, 2012

(65) Prior Publication Data

US 2013/0236722 A1 Sep. 12, 2013

(51) Int. Cl.
| | |
|---|---|
| C09D 5/00 | (2006.01) |
| B65D 65/46 | (2006.01) |
| B65D 81/38 | (2006.01) |
| D21H 27/10 | (2006.01) |
| D21H 17/22 | (2006.01) |
| D21H 17/28 | (2006.01) |
| D21H 19/10 | (2006.01) |
| D21H 19/12 | (2006.01) |
| D21H 19/34 | (2006.01) |
| D21H 19/70 | (2006.01) |
| B32B 29/00 | (2006.01) |
| B65D 65/42 | (2006.01) |

(52) U.S. Cl.
CPC ............... *C09D 5/00* (2013.01); *B32B 29/002* (2013.01); *B32B 29/007* (2013.01); *B65D 65/42* (2013.01); *B65D 65/466* (2013.01); *B65D 81/38* (2013.01); *D21H 17/22* (2013.01); *D21H 17/28* (2013.01); *D21H 19/10* (2013.01); *D21H 19/12* (2013.01); *D21H 19/34* (2013.01); *D21H 19/70* (2013.01); *D21H 27/10* (2013.01); *B32B 2266/02* (2013.01); *Y02W 90/11* (2015.05); *Y02W 90/13* (2015.05); *Y10T 428/27* (2015.01); *Y10T 428/31775* (2015.04)

(58) Field of Classification Search
CPC .......... A61K 9/48; C09D 5/00; B32B 29/002; B32B 29/007; B65D 65/42; B65D 65/466; B65D 81/38; D21H 17/22; D21H 19/10; D21H 19/12
See application file for complete search history.

(56) References Cited

U.S. PATENT DOCUMENTS

| | | | |
|---|---|---|---|
| 4,076,846 A * | 2/1978 | Nakatsuka et al. | 426/62 |
| 4,435,344 A | 3/1984 | Iioka | 264/45.1 |
| 5,840,139 A | 11/1998 | Geddes et al. | 156/79 |
| 6,030,476 A | 2/2000 | Geddes et al. | 156/79 |
| 7,074,466 B2 | 7/2006 | DeBraal et al. | 428/34.2 |
| 2006/0246127 A1 * | 11/2006 | Freier | 424/451 |

FOREIGN PATENT DOCUMENTS

| | | | |
|---|---|---|---|
| EP | 0 940 240 | 9/1999 | B29C 44/34 |
| EP | 1 060 879 | 6/2006 | B32B 29/00 |

OTHER PUBLICATIONS

ChemicalBook. Porophor. http://www.chemicalbook.com/Search_EN.aspx?keyword=porophor. 2008.*
Finkenstadt, et al. "A direct-current resistance technique for determining moisture content in native starches and starch-based plasticized materials" *Carbohyd. Polym.* 55: 149-154 (2004).
Funke, et al. "Processing and characterization of biodegradable products based on starch" *Polym. Degrad. Stabil.* 59: 293-296 (1998).
Glenn, et al. "In situ laminating process for baked starch-based foams" *Ind. Crop. Prod.* 14(2): 125-134 (2001)
Glenn, et al. "Properties of starch-based foam formed by compression/explosion processing" *Ind. Crop. Prod.* 13: 135-143 (2001).
Glenn, et al. "Starch, fiber and CaCO3 effects on the physical properties of foams made by a baking process" *Ind. Crop. Prod.* 14: 201-212 (2001).
Guan, et al. "Foaming and chain extension of completely biodegradable poly(propylenecarbonate) using DPT as blowing agent" *J. Polym. Res.* 14: 245-251 (2007).
Lawton, et al. "Aspen fiber addition improves the mechanical properties of backed cornstarch foams" *Ind. Crop. Prod.* 19: 41-48 (2004).
Luinstra, "Poly(propylene carbonate), old copolymers of propylene oxide and carbon dioxide with new interests: catalysis and material properties" *Polymer Reviews* 48(1): 192-219 (2008).
Poutanen, et al. "Modification of starch properties with plasticizers" *Trends in Polymer Sci.* 4(4): 128-132 (1996).
Preechawong, et al. "Characterization of starch/poly (ε-caprolactone) hybrid foams" *Polym. Test.* 23: 651-657 (2004).
Preechawong, et al. "Preparation and characterization of starch/poly(L-lactic acid) hybrid foams" *Carbohyd. Polym* 59(3): 329-337 (2005).
Salgado, et al. "Biodegradable foams based on cassava starch, sun flower proteins and cellulose fibers obtaines by a baking process" *J. Food Eng.* 85: 435-443 (2008).
Shogren, et al. "Baked starch forms: starch modifications and additives improve process parameters, structure, and properties" *Ind. Crop. Prod.* 16: 69-79 (2002).
Shogren, et al. "Structure and morphology of baked starch foams" *Polymer* 39: 6649-6655 (1998).
Wilhelm, et al. "Starch films reinforced with mineral clay" *Carbohyd. Polym.* 52: 101-110 (2003).

* cited by examiner

*Primary Examiner* — Alexander Polyansky
(74) *Attorney, Agent, or Firm* — J. Peter Paredes; Rosenbaum IP, P.C.

(57) ABSTRACT

A composition for coating a cellulosic packaging material that includes water, starch at a concentration of about 10% to about 17% by weight, gelatin at a concentration of about 10% to about 12% by weight, glycerol at a concentration of about 5% to about 11% by weight, one or more protein ingredients at a concentration of about 5% to about 10% by weight, and one or more porophors at a concentration of about 3% to about 5.5% by weight. The present invention also relates to a method of preparing the composition for coating cellulosic packaging material.

12 Claims, No Drawings

COATINGS FOR CELLULOSIC MATERIAL AND METHODS OF PREPARING AND APPLYING THEREOF

CROSS-REFERENCE TO RELATED APPLICATIONS

This application claims benefit of Polish Patent Application PL398362, filed Mar. 8, 2012, and incorporates said Polish application by reference in its entirety.

FIELD OF THE INVENTION

The present invention relates to the field of packaging materials and manufacture thereof. In particular, the present invention relates to a composition for coating cellulosic packaging materials and a method of preparing such compositions.

BACKGROUND

Over the past several years, studies concerning foam-based packaging obtained from biorenewable materials have focused on the utilization of starch. There are four basic methods used so far for manufacturing the biodegradable packaging materials having a porous-foamed structure, namely: extrusion, baking process, compression and compression-explosion process.

A well known method for making such packaging involves making an aqueous suspension of starch with suitable additives known in the art, heating the suspension in a two-clamp mould. Shogren et al., POLYMER 39:6649-6655 (1998); Lawton et al., IND. CROP. PROD. 19:41-48 (2004); and Salgado et al., J. FOOD ENG. 85:435-443 (2008). The only foaming agent typically employed is evaporating water. The products of this type are manufactured in systems with a high moisture content (70-80%), therefore, the baking process itself is significantly longer (1-2 min) than the production of similar packaging from polystyrene. The longer time cost is the principal disadvantage of this method.

A similar method can be utilized for manufacturing foams from other biodegradable materials like, for example, polypropylene carbonate), i.e., a copolymer formed from propylene oxide and carbon dioxide (Luinstra, POLYMER REVIEWS 48(1):192-219 (2008)) with N,N'-dinitrozobenzmethylene used as a porophor and the addition of urea as a decomposing activator (Guan et al., J. POLYM. RES. 14: 245-251 (2007)).

Cellulosic/starch packaging materials with a three-layer structure are currently being produced by Novamont SpA in Novara, Italy. For example, Novamont produces a starch polymer that is formed into a corrugated foam sheet. Chynoweth and Gordon, PLASTICS TECHNOLOGY 49(8):14 (2003). Such corrugated cardboards with foam based on the biodegradable polymers derived from starch (which are referred to as "Mater-Bi foam") have been introduced on the European market in year 2002 in the form of a product called "Wave Mater-Bi". The closed-cell foam is formed as a result of foaming by means of water steam in an unconventional extrusion line engineered by Novamont. This method produces the compositions being directly foamed in the stage of extrusion.

U.S. Pat. No. 4,435,344 describes a method for producing the composites by coating paper with a resin or laminated with thermoplastic films. A surface of such material is then heated and joined with a foaming layer of heat-insulating polyethylene. U.S. Pat. Nos. 6,030,476 and 5,840,139 describe a method for producing beverage containers or cups, where the insulating layer is formed by the utilization of thermoplastic synthetic resin. A description of the invention found in the '476 patent provides a heat-insulating material containing a thermoplastic synthetic resin with a low or medium density, for example polyethylene, polyolefin, nylon and a high-density polyethylene layer impermeable to moisture, located on the paper surface. The materials having a similar construction with the heat-insulating layer, made of the synthetic materials are described in European patents EP 0940240 A2 and EP 1060879. U.S. Pat. No. 7,074,466 describes a method for manufacturing a composite material having the heat-insulating properties, which is based on a cardboard layer and an expended foam layer located on the cardboard substrate.

The heat-insulating layers comprise the synthetic materials such as polyvinylidene chloride ("PVDC") or acrylonitrile/methyl methacrylate ("AMM") copolymer foams. This layer is formed at the stage of its coating. The well-known foamed biopolymer materials, primarily starch-based, regardless the used methods of manufacturing are characterized by a low flexibility and a relatively high susceptibility to absorb water steam. Moreover, in the state of being moist, after a long-term of conditioning in the environment with elevated moisture, the other properties of foamed starch undergo deterioration, i.e., the resistance to breaking or tearing, therefore, the attempts to incorporate a number of additions improving the functional properties of the material are still ongoing.

Among numerous attempts described in the research papers, the following should be mentioned: (1) the application of plasticizers to improve flexibility, where the primary plasticizers used for starch include glycerol, polyvinyl alcohol (Finkenstadt and Willett, CARBOHYD. POLYM. 55: 149-154 (2004)), ammonium chloride, sorbitol (Poutanen and Forssell, TRENDS IN POLYMER SCI. 4(4):128-132 (1996); Funke et al., POLYM. DEGRAD. STABIL. 59:293-296 (1998); (2) incorporation of fillers, such as: aspen fibres (Glenn et al., IND. CROP. PROD. 14:201-212 (2001a); Shogren et al., IND. CROP. PROD. 16:69-79 (2002); Lawton et al., supra), clays (Wilhelm et al., CLAY. CARBOHYD. POLYM. 52:101-110 (2003)) and chalk (Glenn and Orts, IND. CROP. PROD. 13:135-143 (2001)); and (3) the use of additives leading to the hydrophobization of starch: caprolactones, such as polycaprolactone ("PCL") (Preechawong et al., POLYM. TEST. 23:651-657 (2004)), polylactic acid ("PLA") (Preechawong et al., CARBOHYD. POLYM. 59:329-337 (2005)). Such prepared materials are frequently treated as hybrids.

Other auxiliary agents have also been used, such as anti-lumping substances (magnesium stearate) or those facilitating maintenance of the gas in the bubbles (e.g., guar rubber) (Shogren et al., supra). In the case of first commercial biodegradable packaging available on the market, protective coatings are frequently applied, the primary task of which is the protection of a hydroscopic biopolymer foam forming the fittings against moisture absorption and the improvement of the mechanical properties (Glenn et al., IND. CROP. PROD. 14:125-134 (2001b)).

SUMMARY OF THE INVENTION

The present invention provides a composition for coating a cellulosic packaging material containing biodegradable materials, such as starch or glycerol or gelatin, and a method for preparing said composition. The composition prepared according to the present invention is employable for any packaging application, including applications for food products.

A composition according to the invention constitutes a heat-insulating layer of natural origin, stiffening and protecting product against mechanical damage and having the capability of absorbing an excess of moisture. Of significant importance also is the possibility of shifting in time the foaming process of a packaging, which allows foaming of finished packaging supplied by the manufactures in the form of the flat pattern just at the stage of product packing using typical methods of industrial heating and using conventional devices. The use of different porophors and the protein components makes it possible to obtain compositions with variable properties. A method of preparing a material by the utilization of the composite according to the invention enables the utilization of specially dedicated and conventional methods, including the standard devices for surface modification used in the paper and printing industry for the formation of coated cellulosic materials. Coating and a further thermal treatment does not deteriorate the original properties of the cardboard substrate.

DETAILED DESCRIPTION

The present invention provides a composition for coating a cellulosic packaging material containing biodegradable materials such as starch, glycerol or gelatin. In some embodiments, the composition is formed by combining in water the following ingredients: starch, gelatin, glycerol, one or more protein ingredients, and one or more porophors. In other embodiments, the ingredients are preliminarily sectored into two components of separate mixtures for ease of handling and mixing, whereby a first component comprises a mixture of starch, gelatin, and glycerol, while the second component comprises a mixture of one or more protein ingredients, one or more porophors, and, optionally, starch. In yet other embodiments of the present invention, the glycerol ingredient is combined with sorbitol and used at the same overall concentration as is recited herein for use of glycerol alone.

The gelatin component is predominantly composed of collagen, which is a protein that may be derived from many sources, including, without limitation intended, animals generally, and commonly from hard or connective tissues of pigs, horses, cattle, and fish. Gelatin may be isolated, for example, from the skin or hide, bones, connective tissue, or hooves of any animal that has such structures, including those recited above. Gelatin can also be derived from collagens produced by transgenic bacteria or transgenic yeast that have been engineered to express the collagen gene, which has been sourced from a number of different animals as well as humans. Vegetable sources of gelatin-like materials may be used in combination with or instead of gelatin, using the same overall proportions as set forth herein for gelatin alone. Such gelatin-like materials include the following, without limitation intended: Agar, caragreen, xanthan gum, locust bean gum, guar gum, gum Arabic, among others. While it is the case that collagen is a protein, and certain gelatin-like materials may be protein as well, for the purposes of the present invention, the limitation of "one or more protein ingredients" included in the composition for coating a cellulosic material is not satisfied by the gelatin or gelatin-like material that is also included in the composition.

Starch may also be derived from many different sources, including, without limitation, plants; and starches usefully employed in the context of the present invention include starches that have been refined or processed as well as native starch derived from plants, such as potatoes or corn and the like. Without limitation intended, useful starches include native, refined, or processed starch isolated from corn, cassava (source of tapioca), wheat, potato, and the like.

Any such starch may be added only as an ingredient of the first component or as an ingredient of both the first and the second component. If starch is the ingredient of both components, then the starch content in the first component is in the range of about 4% to about 10% by weight ("wt %") in some embodiments, and in other embodiments in the range of about 4 wt % to about 7 wt %.

The amount of particular ingredients in the components in one embodiment is such that after the dissolution of both components in water, it permits to obtain a composition with the concentration of starch at about 2 wt % to about 25 wt %, gelatin or gelatin-like material at about 8 wt % to about 15 wt %, glycerol or a mixture of glycerol and sorbitol at about 4 wt % to about 15 wt %, one or more protein ingredients at about 5 wt % to about 10 wt %, and the one or more porophors at about 2 wt % to about 10 wt %, with the proviso that the one or more protein ingredients do not include the gelatin or gelatin-like material.

In another embodiment of the present invention, the composition includes the following ingredients at the recited ranges of concentrations: starch at about 10 wt % to about 17 wt %, gelatin at about 10 wt % to about 12 wt %, glycerol or a mixture of glycerol and sorbitol at about 5 wt % to about 11 wt %, one or more protein ingredients at about 5 wt % to about 10 wt %, and the one or more porophors at about 3 wt % to about 5.5 wt %.

In yet another embodiment of the present invention, the composition includes the following ingredients at the recited ranges of concentrations: starch at about 12 wt % to about 15 wt %, gelatin at about 10 wt % to about 12 wt %, glycerol or a mixture of glycerol and sorbitol at about 8 wt % to about 10 wt %, one or more protein ingredients at about 7 wt % to about 9 wt %, and the one or more porophors at about 4 wt % to about 5 wt %.

The mixture of glycerol and sorbitol may range from nearly all glycerol to nearly all sorbitol and any point there between, i.e., glycerol:sorbitol ratios ranging between 0.01: 99.99 to the reverse of 99.99:0.01; albeit, commonly, the glycerol:sorbitol mixture is one of 1:9, 1:4, 2:3, 3:2, 4:1, or 9:1, but there is no reason not to use any mixture ratio where the glycerol occupied from near 0% straight through to near 100% of the mixture.

The protein ingredients are generally of natural origin, typically containing a protein of animal or plant origin; common such protein ingredients include egg albumin, highly foamable albumin, sodium caseinate, casein, milk proteins, soya proteins, zein, gluten, and mixtures thereof.

The porophors utilized as foaming agents are the bicarbonates of alkali metals or ammonium, the mixtures of such bicarbonates, or azodicarbonamide. Other foaming agents may include baking powder, titanium hydride, zirconium(II) hydride, hydrazine, and the like. One of ordinary skill in the art is necessarily familiar with foaming agents otherwise known as blowing agents having the requisite characteristic of creating voids in a matrix to produce cellular materials.

Another embodiment of the invention provides a method for preparing a composition for coating a cellulosic packaging material comprising a mixing of the biodegradable materials such as starch, glycerol, subjecting thereof to a thermal treatment, which is characterized in that, gelatin, glycerol or a mixture of glycerol and sorbitol and starch are dispersed in water using a mechanical stirrer, said mixture is then heated to a temperature in the range of about 50° C. to about 100° C. to attain a uniform consistency. Next, the mixture is cooled down to a temperature in the range from about 35° C. to about 40° C. with continuous stirring followed by adding the protein ingredients and the porophors, and is stirred to obtain a uniform consistency. Such an obtained composition is coated onto a cellulosic material.

Gelatin, glycerol or a mixture of glycerol and sorbitol, and starch are dispersed in one embodiment in such amount as to obtain an aqueous suspension with the concentration of starch in the range of about 10 wt % to about 17 wt %, gelatin in the range of about 10 wt % to about 12 wt %, glycerol or a mixture of glycerol and sorbitol in the range of about 5 wt % to about 11 wt %. The protein ingredients and the porophors are added to a cooled-down mixture in such an amount that is required to obtain an aqueous suspension with the concentration of the protein ingredients in the range of about 5 wt % to about 10 wt %, and the porophors in the range of about 3 wt % to about 5.5 wt %.

In another embodiment of the invention, a portion of starch, gelatin, and glycerol or a mixture of glycerol and sorbitol is dispersed in such amount as to obtain an aqueous suspension with the concentration of starch in the range of about 4 wt % to about 7 wt %, gelatin in the range of about 4 wt % to about 7 wt %, gelatin in the range of about 10 wt % to about 12 wt %, glycerol or a mixture of glycerol and sorbitol in the range about 5 wt % to about 11 wt %. The remaining portion of starch is added to the mixture after cooling in such an amount that is required to obtain the final composition with the concentration of starch in the range of about 10 wt % to about 17 wt %; the protein ingredients and the porophors are also added to the mixture after cooling.

As noted above, the protein ingredients are products of natural origin that contain a protein of animal or plant origin, and are commonly selected from the group consisting of egg albumin, highly foamable albumin, sodium caseinate, casein, milk proteins, soya proteins, zein, gluten, and the mixtures thereof. The porophors comprise the bicarbonates of alkali metals or ammonium, and the mixtures thereof, or azodicarbonamide.

A heat-insulating packaging material according to one embodiment of the invention includes a cellulosic material coated by a layer of foamable coating, where said cellulosic material has at least one layer of a foamable coating generate by an aqueous suspension of starch at the concentration of about 10 wt % to about 17 wt %, gelatin at the concentration of about 10 wt % to about 12 wt %, glycerol or a mixture of glycerol and sorbitol at the concentration of about 5 wt % to about 11 wt %, the protein ingredients at the concentration of about 50 wt % to about 10 wt %, the porophors at the concentration of about 3 wt % to about 5.5 wt %, which is coated on the cellulosic material. In another embodiment of the invention, the foamable coating coated onto the cellulosic material is obtained from an aqueous suspension that includes starch at a concentration of about 12 wt % to about 15 wt %, gelatin at a concentration of about 11 wt %, glycerol or a mixture of glycerol and sorbitol at a concentration of about 7 wt % to about 9 wt %, protein ingredients at a concentration of about 50 wt % to about 25 wt %, and porophors at a concentration of about 4 wt %. In yet another embodiment of the invention, the foamable coating coated onto the cellulosic material is obtained from an aqueous suspension that includes starch at a concentration of about 15 wt %, gelatin at a concentration of about 11 wt %, glycerol or a mixture of glycerol and sorbitol at a concentration of about 8 wt %, protein ingredients at a concentration of about 30 wt %, and porophors at a concentration of about 4 wt %.

The protein components comprise products of natural origin containing a protein of animal or plant origin, preferably egg albumin, highly foamable albumin, sodium caseinate, casein, milk proteins, soya proteins, zein, gluten, and the mixtures thereof. The porophors comprise the bicarbonates of alkali metals or ammonium, and the mixtures thereof, or azodicarbonamide. A material may have an additional layer of a cellulosic material so that, the foamable coating is located between the cellulosic materials. The cellulosic material has the form of paper or cardboard with a basic weight in the range from about 40 g/m$^2$ to about 350 g/m$^2$.

Another embodiment of the invention provides a method for preparing a heat insulating packaging material, comprising coating of cellulosic material with a coating from the biodegradable materials, drying and foaming, which is characterized in that, gelatin, glycerol or a mixture of glycerol and sorbitol, and starch is dispersed in water using a mechanical stirrer, the mixture is heated to a temperature in the range of about 50° C. to about 100° C. to obtain a uniform consistency. The mixture is then cooled down to a temperature in the range from about 35° C. to about 40° C. using continuous stirring, followed by adding protein components and porophors. The stirring is used to attain a uniform consistency of the composition, and a cellulosic material is coated with at least one layer of the so obtained composition. A coating of cellulosic material takes place by the utilization of classical methods by means of grooved rollers, coating presses, by the methods of offset and flexographic printing, coating with the use of knife or curtain. One skilled in the art can adjust web speed, knife form, angle, and distance appropriate for intended results as further described herein and, again, generally known in the art. The tested range conducted by applicants included web speeds that ranged down to about 6 m/min; slower speeds were not technically possible below that on the instrument used, as further described in the examples below. Typical web speed was about 100 m/min, but, as can be appreciated by those of skill in the art, all such parameters are dependent on the design of the printing machine, materials to be applied, etc.

Additionally, in the case of composition in the form of paste with high viscosity in the range of about 1,000 mPas to about 10,000 mPas, a method of direct extrusion can be used by the utilization of sheet die enabling the coating in the form of a solid or intermittent layer. One device usefully employed for mixing and/or extruding the aforestated composition is called LABTECH LTE 20-40, available from Labtech Engineering Co. Ltd., Samutprakarn 10280, Thailand. However, any device allowing for paste mixing and/or extruding at a temperature lower than that where porophor decomposition occurs may be suitably employed.

When coating is accomplished, a material is subject to preliminary drying and is subjected to foaming with the application of known heating methods. Any heating method that provides a substantially uniform heating of the material can be usefully employed. For example, one can apply heat in a chamber (as in a standard dryer or furnace), a microwave, or an infrared (IR) radiator, any of which provide foaming capability.

Gelatin, glycerol or a mixture of glycerol and sorbitol, and starch is dispersed in water in such an amount that is required to obtain an aqueous suspension with the concentration of starch in the range of about 10 wt % to about 17 wt %, gelatin in the range of about 10 wt % to about 12 wt %, glycerol or a mixture of glycerol and sorbitol in the range of about 5 wt % to about 11 wt %. The protein ingredients and the porophors are added to a cooled down mixture in such an amount that is required to obtain an aqueous suspension with the concentration of the protein ingredients in the range of about 5 wt % to about 10 wt %, and the porophors in the range of about 3 wt % to about 5.5 wt %.

In another embodiment, according to the invention, a portion of starch, gelatin, and glycerol is dispersed in water in such an amount that is required to obtain an aqueous suspension with the concentration of starch in the range of about 4 wt % to about 7 wt %, gelatin in the range of about 10 wt % to about 12 wt %, glycerol or a mixture of glycerol and sorbitol in the range of about 5 wt % to about 11 wt %. The remaining portion of starch, sufficient to attain the final composition with the concentration of starch in the range of about 10 wt % to about 17 wt %, is added to a mixture after cooling down together with the protein components and the porophors. The protein components comprise the products of natural origin containing a protein of animal or plant origin, and are commonly selected from the group consisting of egg albumin, highly formable albumin, sodium caseinate, casein, milk protein, soya proteins, zein, gluten, and mixtures thereof. The porophors comprise bicarbonates of alkali metals or ammonium, mixtures thereof, or azodicarbonamide. A temperature and time of preliminary drying is established depending on the applied porophor, so that decomposition of the porophor takes place yet, under the same conditions, thermal decomposition of other components does not take place.

In another embodiment of the present invention, the composition is coated onto a first cellulosic material in the form of a thin layer that is between about 5 µm and about 1000 µm and has a constant or variable thickness and a basic weight ranging from about 5 g/m$^2$ to about 200 g/m$^2$. Coating a composition in the form of a layer with variable thickness of between 1 mm and 10 mm in the form of alternating stripes where each stripe has a width that is between about 1 mm and about 10 mm limits a phenomenon of curling of a cellulosic material which occurs during drying. A foaming process of coating onto the cellulosic material is carried out utilizing the heat energy or microwaves of a microwave oven or a convection oven. In yet another embodiment, the coated first cellulosic material is additionally plied with a second cellulosic material attached to the composition. In many embodiments of the present invention, the cellulosic material used is in the form of paper or cardboard, which has a basic weight in the range from about 40 g/m$^2$ to about 350 g/m$^2$.

The aforementioned ingredients for preparing a foamable coating have been described by examples and by the function(s) that they serve. Additionally, further examples are set forth here, wherein suitable biodegradable polymers usefully employed for the here-described invention include starch, gelatin, gelatin-like materials, sodium caseinate, casein, milk protein, soya protein, zein, gluten; suitable plasticizers, such as glycerol and the like; suitable porephors, such as bicarbonates of alkali metals, diazocarboamid; suitable organic and mineral fillers, such as calcium carbonate, clay, and the like. It is useful to use only those substances that are permissible for contact with food, which include those listed immediately above.

The embodiment of the invention that increases insulating capacity of packaging material presents a modern heat-insulating composite packaging material for food with a foamed insulation layer on the basis of a component that is permissible for contact with food.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

A suspension having the concentration of starch in the range of 10 wt %, gelatin in the range of 10 wt %, glycerol in the range of 5 wt % is mixed using a mechanical stirrer. Next, a mixture is heated to a temperature of 50° C. in order to dissolve all the ingredients and then is cooled down to a temperature of 35° C. Subsequently, a protein component in the form of egg albumin, the porophor in the form of sodium bicarbonate were added to the mixture so that the concentration of the protein component in the mixture amounted to 5 wt %, whereas that of porophor to 3 wt %. The mixture is mixed until a uniform composition is achieved. So prepared composition is used for a one-side coating of a paper having a basic weight of 50 g/m$^2$ using a standard coating press. One layer of coating in the form of a thin layer (i.e., between 5 µm and 200 µm) having a constant thickness between 5 µm and 200 µm (±10%) and a basic weight of 10 g/m$^2$ is applied by means of a knife. A material is then subject to preliminary drying at a temperature of 25° C. for about 20 hours by use of any well-known method used for paper drying. So obtained composite is subjected to foaming by heating said composite in a microwave oven with power 90 W for 90 seconds.

Example 2

An aqueous mixture is prepared having starch at 17 wt %, gelatin at 11 wt %, glycerol at 8 wt % by mixing the ingredients in water using a mechanical stirrer. Next, the mixture is heated to 80° C. in order to dissolve the ingredients and then it is cooled down to 35° C. Subsequently, highly foamable albumin and sodium bicarbonate are added to the mixture so that the respective concentrations in the mixture amount to 8 wt % and 4 wt %. The mixture is mixed until a uniform composition is achieved. So prepared composition is used for a one-side coating of a cardboard having a basic weight of 350 g/m$^2$ by the use of grooved rollers for applying the composition to the cardboard. Two layers of coating in the form of a thin layer as earlier described and having a variable thickness and a basic weight of 200 g/m$^2$ is applied in the form of alternating stripes as earlier described. The coating method is obtainable by any type of machine provided it can apply stripes of indicated thickness and a total thickness in case of two-layer coverage. The minimal thickness of the applied wet layer is 50 µm: when covered twice, for example upon application of two layers of 25 µm each, or any combination that results in the total of 50 µm or more, is usefully employed in the present invention.

The material is then subjected to preliminary drying at a temperature of 25° C. for about 20 h by the use of any well-known method used for cardboard drying. So obtained composite is subjected to foaming by heating said composite in a convective oven at a temperature of 170° C. for 90 seconds.

Example 3

A suspension having the concentration of starch in the range of 4 wt %, gelatin in the range of 12 wt %, glycerol in the range of 10 wt % is mixed using a mechanical stirrer. Next, a mixture is heated to a temperature of 100° C. in order to dissolve all the ingredients and then it is cooled down to a temperature of 40° C. Subsequently, a protein component in the form of sodium caseinate, a porophor in the form of a mixture of sodium and potassium bicarbonate were added to the mixture so that the concentration of starch amounted to 4 wt %, the protein component amounted to 10 wt % and a porophor amounted to 5 wt %. The mixture is mixed until a uniform composition is achieved. So prepared composition is used for a one-side coating of a cardboard having a basic weight of 200 g/m$^2$ by the use of an offset printing machine. A coating in the form of three thin layers as described above and having a variable thickness and a basic weight of 100 g/m$^2$ is coated in the form of alternating stripes. A material is then preliminarily dried at a temperature of 25° C. for about 20 hours by the utilization of any well-known method used for cardboard drying. So prepared composite is subjected to foaming by heating said composition in a conventional oven at a temperature of 170° C. for 90 seconds.

Example 4

A suspension having the concentration of starch in the range of 6 wt %, gelatin in the range of 12 wt %, glycerol in the range of 10 wt % is prepared, such prepared suspension is mixed using a mechanical stirrer and heated to a temperature of 100° C. in order to dissolve all the ingredients, and then the suspension is cooled down to the temperature of 40° C. Next, starch, a protein component in the form of sodium caseinate and a porophor in the form of mixture of sodium and potassium bicarbonate are dispersed in cold water of temperature below 20° C. so that the concentration of starch in the mixture amounted to 6 wt %, the protein component amounted to 10 wt %, whereas that of porophor to 5 wt %. The two dispersions are mixed until a uniform composition is achieved. So prepared composition is used for a one-side coating of a cardboard having a basic weight of 200 g/m$^2$ by the use of offset printing. One layer of coating in the form of a thin layer having a constant thickness and a basic weight of 100 g/m$^2$ is coated by use of a curtain. A material is then preliminarily dried at a temperature of 25° C. for about 20 h by the utilization of any well-known method used for paper drying. So prepared composite is subjected to foaming by heating said composite in a microwave oven with power of 90 W for 90 seconds.

Example 5

A suspension having the concentration of starch in the range of 7 wt %, gelatin in the range of 12 wt %, glycerol in the range of 11 wt % is mixed using a mechanical stirrer. Next, the mixture is heated to a temperature of 100° C. in order to dissolve all the ingredients and then it is cooled down to the temperature of 40° C. Subsequently, a protein component in the form of soya and milk protein (at the ratio of 1:1) and a porophor in the form of azodicarbonamide were added to the mixture so that the starch concentration amounted to 7 wt %, the protein component amounted to 9 wt %, whereas that of porophor to 5.5 wt %. The mixture is mixed until a uniform composition is achieved. So prepared composition is used for a one-side coating of a cardboard having a basic weight of 200 g/m$^2$ with the use of offset printing. A coating in the form of three thin layers having a variable thickness and a basic weight of 100 g/m$^2$ is coated in the form of alternating strips. A material is then preliminarily dried in the temperature of 25° C. for about 20 h by the use of any well-known method used for cardboard drying. So prepared composition is subjected to foaming by heating said composition in a conventional oven at a temperature of 90° C. for 90 seconds.

Example 6

A suspension was prepared in the same manner as described in Example 5, except that a mixture of glycerol and sorbitol is used so that the fraction thereof amounted to 6 wt % and 3 wt % of porophor in the form of azodicarbonamide. Temperature of preliminary drying amounted to 25° C., a time amounted to 20 h, a foaming temperature was 90° C., a foaming time was 90 seconds.

Example 7

A suspension having a concentration of starch in the range of 7 wt %, gelatin in the range of 12 wt %, glycerol in the range of 11 wt % is prepared, then so prepared suspension is mixed using a mechanical stirrer and heated to a temperature of 100° C. in order to dissolve all the ingredients. Next, the mixture is cooled down to a temperature of 40° C. and a protein component in the form of a mixture of soya and milk protein at the ratio of 1:3 and a porophor in the form of azodicarbonamide are added so that the concentration of starch in the mixture amounted to 7 wt %, a protein component amounted to 9 wt %, whereas the concentration of porophor amounted to 5.5 wt %. So obtained composition is used for a one-side coating of a cardboard having a basic weight of 200 g/m$^2$. A material is then preliminarily dried in a temperature of 25° C. for about 20 hours by the use of any well-known method used for paper drying. So prepared composite is subjected to foaming by heating said composite in a microwave oven power of 90 W for 90 seconds.

Example 8

A solution as in Example 6 except that instead of glycerol and sorbitol glycerol is used, so that a fraction thereof amounted to 6 wt % and a porophor used in the form of azodicarbonamide was in the range of 3 wt %. A temperature of preliminary drying amounted to 25° C., a time amounted to about 20 hours. Due to the application of azodicarbonamide as a porophor, a lower temperature can be applied during foaming in a conventional oven (90° C., foaming time of 90 seconds).

Example 9

A solution as in Example 1, except that casein is used as the protein component, and ammonium bicarbonate is used as a porophor. A temperature of preliminary drying amounted to 25° C., the time about 20 hours, foaming temperature 170° C., foaming time 90 seconds.

Example 10

A solution as in Example 1, except that soya protein was used as the protein component, and a mixture of sodium bicarbonate with potassium bicarbonate was used as a porophor. The temperature of preliminary drying amounted to 25° C., the time amounted to about 20 hours, foaming temperature was 170° C. and foaming time was 90 seconds.

Example 11

A solution as in Example 1, except that gluten was used as a protein component, and potassium bicarbonate was used as a porophor. A temperature of preliminary drying amounted to 25° C., the time amounted to about 15 h, foaming temperature of 170° C., foaming time of 90 seconds.

Example 12

Different variants of composite were prepared using method as described in Example 1. The cellulosic material used was a cardboard having a basic weight of 320 g/m². Additionally applied and attached to the composition was a second cellulosic material in the form of paper of 80 g/m². The coating layer was applied either as a solid layer as described in Example 1 or as a striped layer as described in Example 2. Ingredients and the amounts used are presented in the table below. The particular variants are marked in the table as A, B, C, D, E, F.

The composites obtained where cut into a pattern which could then be shaped to form a packaging box, in the manner typical for preparing packaging boxes made of paper and cardboard.

Results obtained for all variants A to F, wherein a solid layer of composition was applied, showed tearing of the cardboard layer in places where it was bent to form a packaging. Despite different techniques used for shaping, the tearing would always appear either immediately after bending or within 2-3 cycles of closing and opening of the packaging. In variants A to F, wherein the striped composition layer was applied, said unfavorable property did not occur. Also, the composites, having a striped layer of the composition, showed lower resistance to bending as compared with the composites having a solid composition layer applied.

The composites were subjected to Flat Crash Testing ("FCT"), which measures the load-bearing capability of a single-flute corrugated cardboard specimen to loads acting perpendicular to the fluting under generally ambient conditions of about 23° C. and 50% relative humidity over a 24 hour period. The test used is identified as International Standard ISO 3035, which was developed and published by the International Organization for Standardization of Geneva, Switzerland ("ISO"; see http://www.iso.org/), which ISO publication is herein incorporated by reference. Following the standard protocol as is well-known in the art, the FCT results obtained show that it was possible to produce composites having a load-bearing capability close to that presented by standard corrugated cardboard BO 320 (FCT values for BO 320 cardboard are typically in the range of 0.42-0.7 kN).

The composites A to F all are capable of steam absorption, with efficacy much higher than that typically presented by traditionally used packaging materials, i.e. polystyrene both bead and expanded (steam absorption value of about 0.0007 kg/m²), paper of basic weight of 80 g/m² (steam absorption value of about 0.0013 kg/m²), cardboard of basic weight of 320 g/m² (steam absorption value of about 0.0026 kg/m²). The corrugated cardboard used in the composites A to F and not treated according to invention showed the steam absorption value of about 0.002 kg/m².

The results presented in the table demonstrate that the composites obtained according to the present invention provide rigid, resistant to bending and moisture absorbing packaging material.

TABLE

| Ingredient | | A | B | C | D | E | F |
|---|---|---|---|---|---|---|---|
| Potato starch [%] | | | 17 | | | 7 | |
| Gelatine [%] | | | 10 | | | 12 | |
| Glycerol and/or sorbitol [%] | | | 5 | | 6 | 11 | |
| Protein components [%] | a) milk protein b) soya protein | | 7.5 | | | 9 | |
| Ratio w/w of protein components (a:b) | | 1:0 | 3:1 | 1:1 | 1:0 | 3:1 | 1:3 |
| Porophor fraction [%] | | | 4.2 | | 3 | 5.5 | |
| Dry matter [g] | | | 43.7 | | | 44 | |
| Starch fraction in dry matter [%] | | | 38 | | | 27 | |
| Cellulosic layers [g/m²] | Cardboard | | | 320 | | | |
| | Paper | | | 80 | | | |

| | | | A | B | C | D | E | F |
|---|---|---|---|---|---|---|---|---|
| | | | solid layer | | | | | |
| Increase in weight [%] | Microwave heating | Average | 491 | 136 | 462 | 342 | 70 | 348 |
| | | STDN[1] | 79.5 | 28.0 | 131.1 | 50.3 | 27.7 | 47.6 |
| | | | striped layer | | | | | |
| | | Average | 326 | 93 | 108 | 96 | 64 | 147 |
| | | STDN[1] | 91.183 | 48.748 | 13.868 | 52.918 | 34.530 | 44.467 |
| | | | solid layer | | | | | |
| | Conventional heating | Average | 498 | 437 | 225 | 299 | 138 | 495 |
| | | STDN[1] | 52.975 | 7.371 | 7.234 | 12.858 | 7.024 | 124.179 |
| | | | striped layer | | | | | |
| | | Average | 309 | 267 | 241 | 165 | 139 | 146 |
| | | STDN[1] | 40.415 | 40.513 | 12.741 | 31.607 | 3.786 | 49.943 |
| FCT [kN] | Microwave heating | Average | 0.13 | 0.173 | 0.325 | 0.557 | 0.77 | 0.737 |
| | | STDN[1] | 0.016 | 0.031 | 0.032 | 0.021 | 0.172 | 0.05 |
| | Conventional heating | Average | 0.137 | 0.117 | 0.18 | 0.423 | 0.583 | 0.913 |
| | | STDN[1] | 0.026 | 0.065 | 0.111 | 0.074 | 0.211 | 0.55 |
| Bending force [N] | Solid layer | Average | 0.528 | 0.625 | 1.093 | 3.698 | 2.608 | 4.27 |
| | | STDN[1] | 0.103 | 0.057 | 0.138 | 1.695 | 0.767 | 1.764 |
| | Striped layer | Average | 0.408 | 0.625 | 0.73 | 1.64 | 2.588 | 1.05 |
| | | STDN[1] | 0.109 | 0.218 | 0.135 | 0.993 | 0.270 | 0.455 |

TABLE-continued

| Ingredient | | | A | B | C | D | E | F |
|---|---|---|---|---|---|---|---|---|
| | | | solid layer | | | | | |
| Steam absorption [g/m$^2$] | Microwave heating | Average STDN$^1$ | 0.21 0.114 | 0.35 0.002 | 0.44 0.009 | 0.75 0.014 | 0.50 0.004 | 0.51 0.003 |
| | | | striped layer | | | | | |
| | | Average STDN$^1$ | 0.42 0.013 | 0.39 0.000 | 0.35 0.012 | 0.78 0.010 | 0.27 0.007 | 0.70 0.071 |
| | | | solid layer | | | | | |
| | Conventional heating | Average STDN$^1$ | 0.26 0.001 | 0.31 0.005 | 0.46 0.008 | 0.58 0.020 | 0.51 0.005 | 0.45 0.004 |
| | | | striped layer | | | | | |
| | | Average STDN$^1$ | 0.44 0.012 | 0.39 0.008 | 0.33 0.007 | 0.58 0.012 | 0.26 0.009 | 0.70 0.003 |

$^1$STDN = Standard Deviation

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings, if any. Such modifications are intended to fall within the scope of the appended claims. All publications cited herein are incorporated by reference in their entirety.

What is claimed:

1. A composition for a coating for a cellulosic packaging material comprising water, starch at a concentration of about 2% to about 25% by weight, gelatin material at a concentration of about 8% to about 15% by weight, glycerol at a concentration of about 4% to about 15% by weight, one or more protein ingredients to make the coating at a concentration of about 5% to about 10% by weight in addition to the gelatin material, wherein the protein ingredients are selected from the group consisting of egg albumin, foamable albumin, sodium caseinate, casein, milk protein, soy protein, zein, gluten, and mixtures thereof, one or more porophors at a concentration of about 2% to about 10% by weight, wherein the one or more porophors are selected from the group consisting of bicarbonates of alkali metals, bicarbonates of ammonium, mixtures of said bicarbonates, and azodicarbonamide, all combined in a foamed coating on top of a paper or cardboard packaging material.

2. The composition according to claim 1, further comprising sorbitol such that the composition includes glycerol and sorbitol together at a concentration of about 4% to about 11% by weight.

3. The composition according to claim 1, wherein the foamed coating is in the form of a sheet or web.

4. The composition according to claim 1, wherein the foamed coating is a composition in the form of a layer with variable thickness of between 1 mm and 10 mm in the form of alternating stripes, wherein each stripe has a width that is between about 1 mm and about 10 mm.

5. A method for preparing a composition for coating a cellulosic packaging material as described in claim 1 comprising preparing a composition of biodegradable materials in water to form an aqueous mixture followed by subjecting the aqueous mixture to a thermal treatment, wherein the aqueous mixture comprises gelatin, glycerol, and starch.

6. The method of claim 5, wherein the aqueous mixture is heated to a temperature in the range of about 50° C. to about 100° C. until a uniform consistency is achieved, then the aqueous mixture is cooled down to a temperature in the range from about 35° C. to about 40° C. with continuous stirring after which one or more protein ingredients, one or more porophors, and, optionally, more starch are added to the aqueous mixture, wherein the protein ingredient is defined not to include gelatin or a gelatin-like material.

7. The method according to claim 6, wherein the aqueous mixture further comprises sorbitol.

8. The method according to claim 7, wherein the gelatin, glycerol, and starch are combined together as a first component and the one or more protein ingredients, one or more porophors, and, optionally, more starch are combined together as a second component.

9. The method according to claim 7, wherein the gelatin, glycerol or a mixture of glycerol and sorbitol, and starch are dispersed in such amount as to obtain an aqueous suspension having a concentration of starch in the range of about 10% to about 17% by weight, gelatin in the range of about 10% to about 12% by weight, glycerol or the combination of glycerol and sorbitol in the range of about 5% to about 11% by weight.

10. The method according to claim 7, wherein the one or more protein ingredients and the one or more porophors are added to the cooled mixture in such an amount as to obtain an aqueous suspension having a concentration of the one or more protein ingredients in the range of about 5% to about 10% by weight, and the one or more porophors in the range of about 3% to about 5.5% by weight.

11. The method according to claim 9, wherein the gelatin, glycerol or a mixture of glycerol and sorbitol, and starch are dispersed in such an amount so as to obtain an aqueous suspension having the concentration of starch in the range of about 4% to about 7% by weight, gelatin in the range of about 10% to about 12% by weight, glycerol or a mixture of glycerol and sorbitol in the range of about 5% to about 11% by weight, wherein further a portion of starch is added in such an amount to said mixture after cooling down together with the one or more protein ingredients and the one or more porophors to obtain a final concentration of starch in the range of about 4% to about 7% by weight.

12. The method according to claim 5, wherein the one or more porophors are selected from the group consisting of bicarbonates of alkali metals, bicarbonates of ammonium, mixtures of said bicarbonates, and azodicarbonamide.

* * * * *